United States Patent
Miyamoto

(10) Patent No.: US 7,527,163 B2
(45) Date of Patent: May 5, 2009

(54) TOP COVER FIXING STRUCTURE

(75) Inventor: Takashi Miyamoto, Osaka (JP)

(73) Assignee: Funai Electric Co., Ltd. (JP)

( * ) Notice: Subject to any disclaimer, the term of this patent is extended or adjusted under 35 U.S.C. 154(b) by 288 days.

(21) Appl. No.: 11/142,305

(22) Filed: Jun. 2, 2005

(65) Prior Publication Data

US 2005/0269828 A1 Dec. 8, 2005

(30) Foreign Application Priority Data

Jun. 2, 2004 (JP) ............................. 2004-164050

(51) Int. Cl.
*B65D 6/28* (2006.01)
(52) U.S. Cl. .................... 220/4.02; 220/327; 174/50; 174/58
(58) Field of Classification Search ............... 220/4.02, 220/327; 174/50, 58; 361/685; 296/39.2
See application file for complete search history.

(56) References Cited

U.S. PATENT DOCUMENTS

| | | | | |
|---|---|---|---|---|
| 4,850,657 A | * | 7/1989 | Placke et al. ................. | 361/685 |
| 5,207,342 A | * | 5/1993 | Tsuji et al. .................. | 220/4.02 |
| 5,398,833 A | * | 3/1995 | Klauss et al. ............... | 220/4.02 |
| 5,743,606 A | * | 4/1998 | Scholder ................... | 312/223.2 |
| 5,848,718 A | * | 12/1998 | Colwell ..................... | 220/4.02 |
| 6,041,956 A | * | 3/2000 | Kao .......................... | 220/4.02 |
| 6,909,047 B2 | * | 6/2005 | Zhang ........................ | 174/50 |
| 7,091,413 B2 | * | 8/2006 | Mukougawa ................. | 174/50 |
| 2004/0231876 A1 | * | 11/2004 | Zhang ........................ | 174/50 |

FOREIGN PATENT DOCUMENTS

| | | |
|---|---|---|
| JP | 54-142713 U1 | 10/1979 |
| JP | 57-127627 U1 | 8/1982 |
| JP | 60-073535 U1 | 5/1985 |
| JP | 61-193669 U1 | 12/1986 |
| JP | 04-060381 U1 | 5/1992 |
| JP | 08-008547 | 1/1996 |
| JP | 08-221970 | 8/1996 |
| JP | 10-059359 | 3/1998 |
| JP | 10-284853 | 10/1998 |
| JP | 2002-314259 | 10/2005 |

* cited by examiner

*Primary Examiner*—Anthony D Stashick
*Assistant Examiner*—Christopher B McKinley
(74) *Attorney, Agent, or Firm*—Bacon & Thomas, PLLC

(57) ABSTRACT

A top cover fixing structure for fixing opposing sidewalls of a top cover to respective opposing sidewalls of a bottom chassis with a single screw for each sidewall, thus reducing the number of parts and thereby reducing the man-hours for assembling, while maintaining the strength of the top cover and improving the design appearance. Screw insertion holes 2*e* are bored in recessed portions 2*c* provided in the front part of the right and left sidewalls 2*a* and 2*b* of the top cover 2, with screws 3 inserted into the screw insertion holes to fix the top cover to the bottom chassis 1, while recessed portions 2*d* provided in the rear of the right and left sidewalls 2*a* and 2*b* of the top cover 2 are in contact with rear portions of the right and left sidewalls 1*a* and 1*b* of the bottom chassis 1.

7 Claims, 4 Drawing Sheets

TOP COVER FIXING STRUCTURE

BACKGROUND OF THE INVENTION

1. Field of the Invention

The present invention relates to a top cover fixing structure in which a bottom chassis is covered with a top cover to be fixed thereto with a screw.

2. Description of the Prior Art

In a conventional top cover fixing structure, screws are inserted into insertion holes in recessed portions provided in the front and rear of the right and left sidewalls of a top cover, and then screwed in the right and left sidewalls of a bottom chassis to fix the top cover to the bottom chassis. This requires two front and rear screws, suffering from a problem that the number of parts and thereby the man-hours for fixing work are increased. In addition, fixing with two front and rear screws suffers from a problem of poor appearance.

In FIG. 7 is shown a first prior art cabinet. As shown in FIG. 7, in order to provide a shielding effect by bringing a top cover 101 and a bottom cover 102, which are made of metal plates, into conductive contact with each other on the side surfaces of the VTR, a fitting portion for the top cover 101 is provided in the bottom cover 102, whereby the covers 101 and 102 are brought into conductive contact with each other, and then fixed to a chassis 103 with screws 104 screwed from the rear side of the VTR (refer to Japanese Patent Laid-Open Publication No. Hei 8-221970 for example).

However, thus fixing the covers 101 and 102 to the chassis 103 with screws from the rear side suffers from a problem of unstable lateral positioning.

SUMMARY OF THE INVENTION

The present invention has been made in consideration of the above-described conventional problems, and an object thereof is to provide a top cover fixing structure capable of fixing the right and left sidewalls of a top cover to, respectively, the right and left sidewalls of a bottom chassis with a single screw for each sidewall, and thus to reduce the number of parts and thereby the man-hours for assembling, and maintaining the strength of the top cover against external forces as well as improving the design appearance.

The present invention has been proposed to solve the above-described problems, and the invention provides a top cover fixing structure in which a bottom chassis is covered with a top cover to be fixed thereto with a screw and then a front panel is fixed to the front end portion thereof, characterized in that screw insertion holes are bored in recessed portions provided in the front part of the right and left sidewalls of the top cover, which cover, respectively, the right and left sidewalls of the bottom chassis, screws being inserted into the screw insertion holes to be fixed to the bottom chassis, while recessed portions provided in the rear part of the right and left sidewalls of the top cover are in contact with the rear part of the external surface of the right and left sidewalls of the bottom chassis, and that nail portions or hole portions are provided in recessed portions provided in the vicinity of the front end of the right and left sidewalls of the bottom chassis, and insertion pieces to be inserted into spaces between the bottom chassis and the front panel are provided in the right and left sidewalls of the front panel, hole portions or nail portions to be engaged with the nail portions or the hole portions of the bottom chassis being provided in the insertion pieces.

In another aspect, the invention provides a top cover fixing structure in which a bottom chassis is covered with a top cover to be fixed thereto with a screw, characterized in that screw insertion holes are bored in recessed portions provided in the front part of the right and left sidewalls of the top cover, which cover, respectively, the right and left sidewalls of the bottom chassis, screws being inserted into the screw insertion holes to be fixed to the bottom chassis, and that the rear part of the right and left sidewalls of the bottom chassis, with which recessed portions provided in the rear part of the right and left sidewalls of the top cover are to be brought into contact, is formed with an engaging shape.

In one embodiment recessed portions, with which the recessed portions in the rear part of the right and left sidewalls of the top cover are to be engaged, are formed in the rear part of the right and left sidewalls of the bottom chassis.

In another embodiment fitting holes, in which the recessed portions in the rear part of the right and left sidewalls of the top cover are to be fitted, are formed in the rear part of the right and left sidewalls of the bottom chassis.

In yet another embodiment small protruding portions protruding inward are provided in the central part of the recessed portions in the rear part of the right and left sidewalls of the top cover, while small holes, in which the small protruding portions provided in the recessed portions in the rear part of the right and left sidewalls of the top cover are to be fitted, are provided in the rear part of the right and left sidewalls of the bottom chassis.

In a further embodiment engaging holes are formed in the central part of the recessed portions in the rear part of the right and left sidewalls of the top cover, while raised portions to be fitted in the engaging holes formed in the recessed portions in the rear part of the right and left sidewalls of the top cover are provided in the rear part of the right and left sidewalls of the bottom chassis.

When assembling the bottom chassis and the top cover, the recessed portions provided in the rear part of the right and left sidewalls of the top cover are brought into contact with the rear part of the external surface of the right and left sidewalls of the bottom chassis, whereby it is not necessary to fix the contacting parts with screws. Therefore, it is possible to fix the right and left sidewalls of the top cover to, respectively, the right and left sidewalls of the bottom chassis with a single screw for each sidewall, and thus to reduce the number of parts and thereby the man-hours for assembling. It is also possible to maintain the strength of the top cover against external forces as well as to improve the design appearance. Further, the hole portions or the nail portions in the insertion pieces provided in the right and left sidewalls of the front panel are adapted to be engaged with the nail portions or the hole portions in the recessed portions provided in the vicinity of the front end of the right and left sidewalls of the bottom chassis, which allows screws for fixing the front panel to be omitted, resulting in a reduction of the number of parts and thereby the man-hours for assembling.

DESCRIPTION OF THE PREFERRED EMBODIMENTS

Embodiments of a top cover fixing structure according to the present invention will hereinafter be described with reference to the accompanying drawings.

Figure 1:
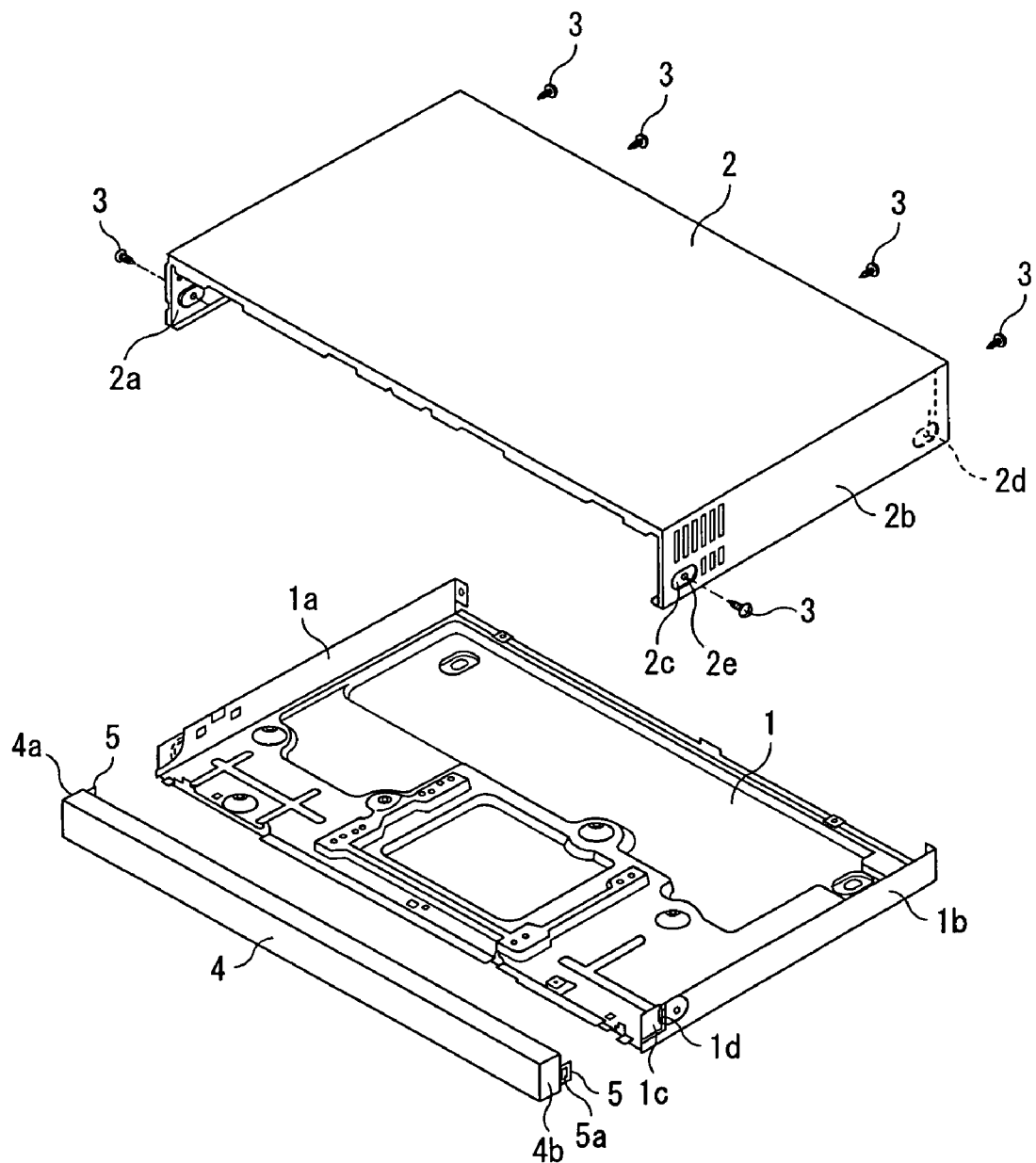
FIG. 1 is a perspective view showing a top cover fixing structure according to a first embodiment of the present invention.
Figure 2:
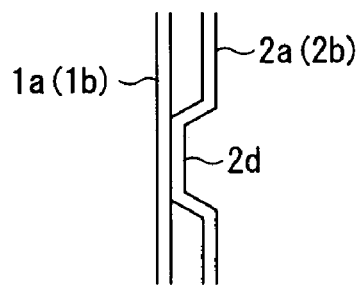
FIG. 2 is a partially enlarged cross-sectional view showing the state where a recessed portion in a sidewall of the top cover is in contact with the external surface of a sidewall of the bottom chassis.

FIG. 1 is a perspective view showing a top cover fixing structure according to a first embodiment of the present invention. FIG. 2 is a partially enlarged cross-sectional view showing the state where a recessed portion in a sidewall of the top cover is in contact with the external surface of a sidewall of the bottom chassis.

In the top cover fixing structure according to the first embodiment, as shown in FIG. 1, screw insertion holes 2e are bored in recessed portions 2c provided in the front part of the right and left sidewalls 2a and 2b of the top cover 2, which cover, respectively, the right and left sidewalls 1a and 1b of the bottom chassis 1, screws 3 being inserted into the screw insertion holes 2e to be fixed to the bottom chassis 1. Also, recessed portions 2d provided in the rear part of the right and left sidewalls 2a and 2b of the top cover 2 are adapted to be in contact with the rear part of the external surface of the right and left sidewalls 1a and 1b of the bottom chassis 1 (refer to FIG. 2).

In addition, nail portions 1d are provided in recessed portions 1c provided in the vicinity of the front end of the right and left sidewalls 1a and 1b of the bottom chassis 1, and insertion pieces 5 to be inserted into spaces between the bottom chassis 1 and a front panel 4 are provided in the right and left sidewalls 4a and 4b of the front panel 4. In the insertion pieces 5 are provided hole portions 5a to be engaged with the nail portions 1d of the bottom chassis 1. Also, the back wall of the top cover 2 is arranged to be fixable to the bottom chassis 1 with four screws 3.

Accordingly, when assembling the bottom chassis 1 and the top cover 2, the recessed portions 2d provided in the rear part of the right and left sidewalls 2a and 2b of the top cover 2 are brought into contact with the rear part of the external surface of the right and left sidewalls 1a and 1b of the bottom chassis 1, whereby it is not necessary to fix the contacting parts with screws. Therefore, it is possible to fix the right and left sidewalls 2a and 2b of the top cover 2 to, respectively, the right and left sidewalls 1a and 1b of the bottom chassis 1 with a single screw to remove one screw for each sidewall, and thus to reduce the number of parts and thereby the man-hours for assembling.

It is also possible to maintain the strength of the top cover 2 against external forces as well as to improve the design appearance. Further, the hole portions 5a in the insertion pieces 5 provided in the right and left sidewalls 4a and 4b of the front panel 4 are adapted to be engaged with the nail portions 1d in the recessed portions 1c provided in the vicinity of the front end of the right and left sidewalls 1a and 1b of the bottom chassis 1, which allows screws for fixing the front panel 4 to be removed, resulting in a reduction of the number of parts and thereby the man-hours for assembling. It will be appreciated that hole portions may be provided in the bottom chassis 1, while nail portions may be provided in the insertion pieces 5 of the front panel 4.

Figure 3:
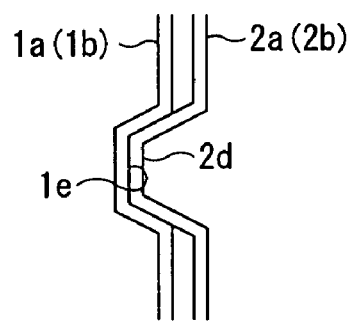
FIG. 3 is a cross-sectional view showing a substantial part of a top cover fixing structure according to a second embodiment.

FIG. 3 is a cross-sectional view showing a substantial part of a top cover fixing structure according to a second embodiment.

In the top cover fixing structure according to the second embodiment, as shown in FIG. 3, recessed portions 1e, with which the recessed portions 2d in the rear part of the right and left sidewalls 2a and 2b of the top cover 2 are to be engaged, are formed in the rear part of the right and left sidewalls 1a and 1b of the bottom chassis 1.

Accordingly, the recessed portions 2d in the rear part of the right and left sidewalls 2a and 2b of the top cover 2 are engaged with the recessed portions 1e in the rear part of the right and left sidewalls 1a and 1b of the bottom chassis 1, which can facilitate the positioning of the top cover 2 against the bottom chassis 1, and also prevent the friction of the top cover 2.

Figure 4:
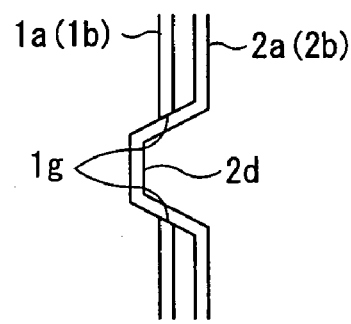
FIG. 4 is a cross-sectional view showing a substantial part of a top cover fixing structure according to a third embodiment.

FIG. 4 is a cross-sectional view showing a substantial part of a top cover fixing structure according to a third embodiment.

In the top cover fixing structure according to the third embodiment, as shown in FIG. 4, fitting holes 1f are formed, in which the recessed portions 2d in the rear part of the right and left sidewalls 2a and 2b of the top cover 2 are to be fitted.

Accordingly, the recessed portions 2d in the rear part of the right and left sidewalls 2a and 2b of the top cover 2 are fitted in the fitting holes 1f in the rear part of the right and left sidewalls 1a and 1b of the bottom chassis 1, which can facilitate the positioning of the top cover 2, and also prevent the friction of the top cover 2.

Figure 5:
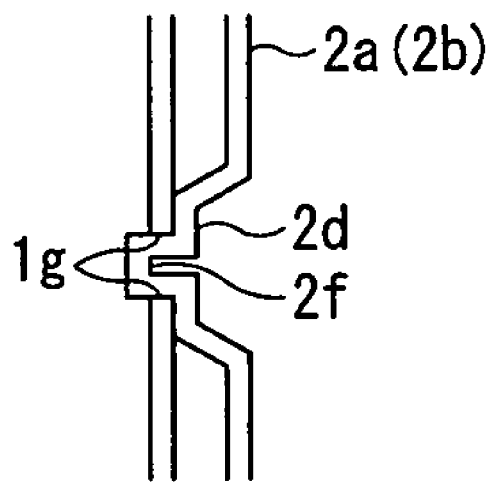
FIG. 5 is a cross-sectional view showing a substantial part of a top cover fixing structure according to a fourth embodiment.

FIG. 5 is a cross-sectional view showing a substantial part of a top cover fixing structure according to a fourth embodiment.

In the top cover fixing structure according to the fourth embodiment, as shown in FIG. 5, small protruding portions 2f protruding inward are provided in the central part of the recessed portions 2d in the rear part of the right and left sidewalls 2a and 2b of the top cover 2, while small holes 1g, in which the small protruding portions 2f provided in the recessed portions 2d in the rear part of the right and left sidewalls 2a and 2b of the top cover 2 are to be fitted, are provided in the rear part of the right and left sidewalls 1a and 1b of the bottom chassis 1.

Accordingly, the small protruding portions 2f provided in the recessed portions 2d in the rear part of the right and left sidewalls 2a and 2b of the top cover 2 are fitted in the small holes 1g in the rear part of the right and left sidewalls 1a and 1b of the bottom chassis 1, which can prevent the friction of the top cover 2, and also maintain the strength of the top cover 2 against external forces.

Figure 6:
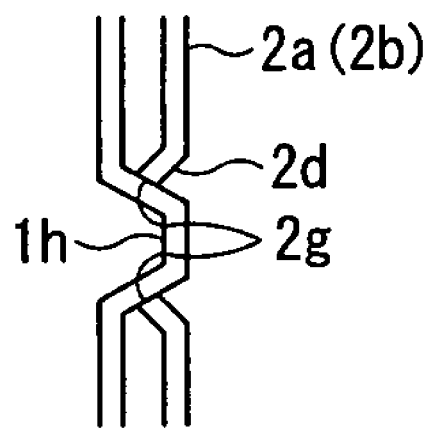
FIG. 6 is a cross-sectional view showing a substantial part of a top cover fixing structure according to a fifth embodiment.
Figure 7:
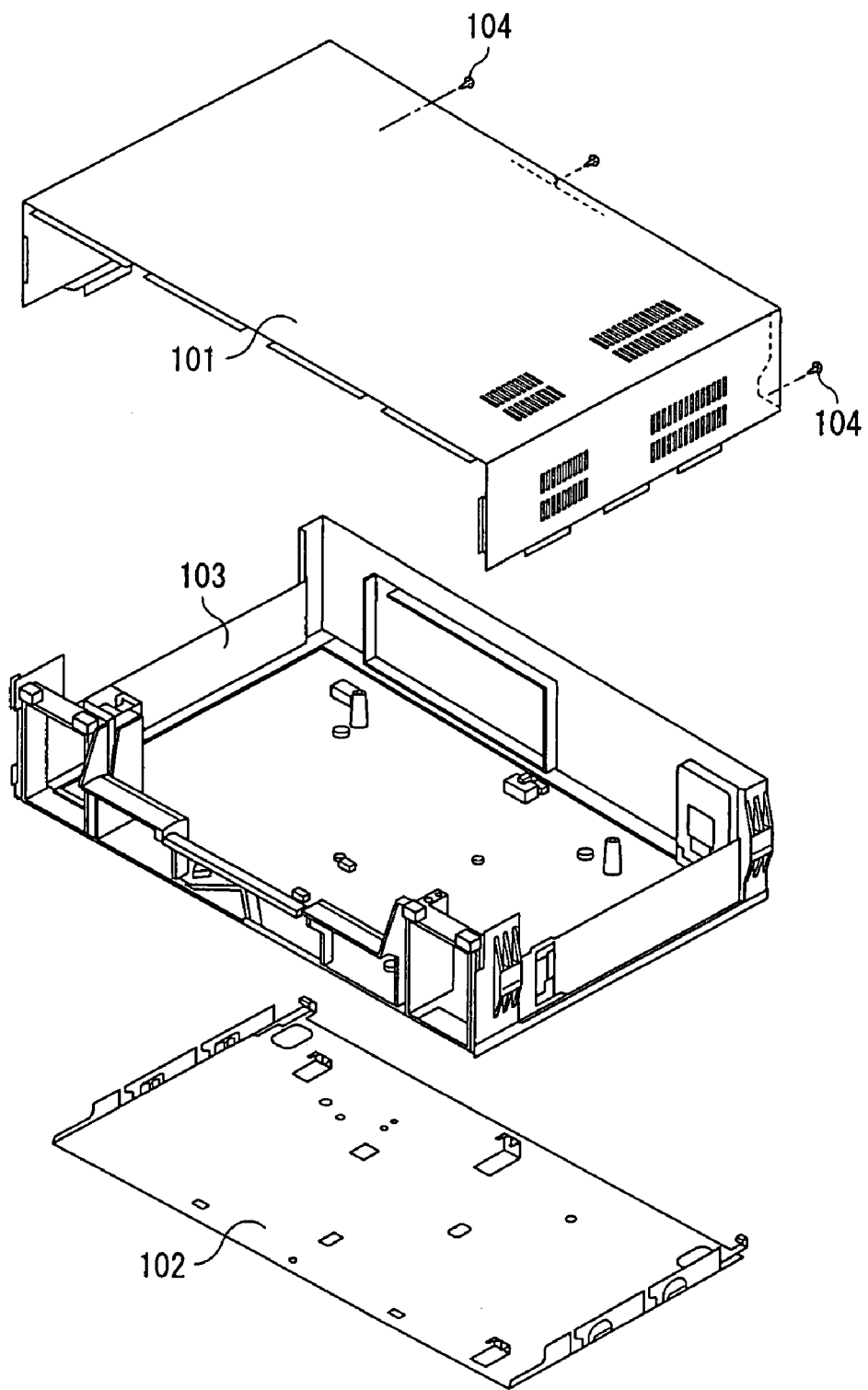
FIG. 7 is an exploded perspective view showing a shielding structure in a conventional VTR.

FIG. 6 is a cross-sectional view showing a substantial part of a top cover fixing structure according to a fifth embodiment.

In the top cover fixing structure according to the fifth embodiment, as shown in FIG. 6, engaging holes 2g are formed in the central part of the recessed portions 2d in the rear part of the right and left sidewalls 2a and 2b of the top cover 2, while raised portions 1h to be fitted in the engaging holes 2g formed in the recessed portions 2d in the rear part of the right and left sidewalls 2a and 2b of the top cover 2 are provided in the rear part of the right and left sidewalls 1a and 1b of the bottom chassis 1.

Accordingly, the raised portions 1h in the rear part of the right and left sidewalls 1a and 1b of the bottom chassis 1 are fitted in the engaging holes 2g provided in the recessed portions 2d in the rear part of the right and left sidewalls 2a and 2b of the top cover 2, which can facilitate the positioning of the top cover 2, and further prevent the friction of the top cover 2.

What is claimed is:

1. A top cover fixing structure for securing together a bottom chassis, a front panel and a top cover covering the bottom chassis and defining a front opening in cooperation with the bottom chassis, the front panel covering the front opening, wherein the top cover includes opposing sidewalls covering opposing sidewalls of the bottom chassis, the cover fixing structure comprising:
   front end and rear end recess portions in each sidewall of the top cover, the rear recess portions respectively contacting the sidewalls of the bottom chassis;
   a front end recess portion in each sidewall of the bottom chassis with one of a nail and a hole for engaging a nail in each front end recess portion; and
   insertion members located at opposing ends of the front panel and having the other of the nail and hole, each of the insertion members being inserted between one of the sidewalls of the top cover and the sidewall of the bottom chassis which is overlapped by the one sidewall of the top cover to hold the front panel in place.

2. A top cover fixing structure for securing together a bottom chassis and a top cover covering the bottom chassis, wherein the top cover includes opposing sidewalls covering opposing sidewalls of the bottom chassis, the cover fixing structure comprising:
   front end and rear end recess portions in each sidewall of the top cover, the front recess portions having screw insertion holes, and screws inserted into the screw insertion holes to fix the top cover to the bottom chassis;
   a rear end engaging shape in each sidewall of the bottom chassis for mating with the rear end recess portions in the sidewalls of the top cover; and
wherein:
   the top cover and bottom chassis define a front opening;
   a front panel covers the opening and has insertion members located at opposing ends, the insertion members having one of a nail and a hole, for engaging the nail, at distal ends, each of the insertion members being inserted between one of the sidewalls of the top cover and the sidewall of the bottom chassis which is overlapped by the one sidewall of the top cover to hold the front panel in place; and
   a front end recess portion is provided in each sidewall of the bottom chassis, each front end recess portion having the other of the nail and hole.

3. The top cover fixing structure according to claim 2 wherein the engaging shapes are recessed portions which mate with the rear end recess portions on the sidewalls of the top cover.

4. The top cover fixing structure according to claim 2 wherein the engaging shapes comprise holes in which are inserted the rear end recess portions of the top cover.

5. The top cover fixing structure according to claim 2 wherein:
   protrusions extend inwardly from the rear end recess portions of the top cover; and
   the engaging shapes in the sidewalls of the bottom chassis comprise holes mating with the protrusions inserted therein.

6. The top cover fixing structure according to claim 2 wherein:
   the recess portions of the top cover have engaging holes; and
   the engaging shapes in the sidewalls of the bottom chassis are raised portions which mate with the recess portions.

7. The top cover fixing structure according to claim 1 wherein said front panel has a front surface and a top surface coextensive with its longest dimension and side surfaces at opposing ends of the front panel, each side surface being joined to the front surface and to the top surface, and wherein the insertion members extend from the opposing ends beyond the side surfaces, in a direction away from the front surface.

* * * * *